(12) United States Patent
Fang et al.

(10) Patent No.: US 8,669,747 B2
(45) Date of Patent: *Mar. 11, 2014

(54) CONSTANT ON-TIME SWITCHING REGULATOR, AND CONTROL METHOD AND ON-TIME CALCULATION CIRCUIT THEREFOR

(75) Inventors: Li-Wen Fang, Taipei (TW); Ting-Jung Tai, Hsinchu (TW); Chih-Hao Yang, Tainan (TW)

(73) Assignee: Ricktek Technology Corporation, R.O.C., Chupei, Hsin-Chu (TW)

( * ) Notice: Subject to any disclaimer, the term of this patent is extended or adjusted under 35 U.S.C. 154(b) by 174 days.

This patent is subject to a terminal disclaimer.

(21) Appl. No.: 13/135,990

(22) Filed: Jul. 20, 2011

(65) Prior Publication Data
US 2012/0019219 A1 Jan. 26, 2012

Related U.S. Application Data

(63) Continuation-in-part of application No. 13/066,595, filed on Apr. 19, 2011.

(30) Foreign Application Priority Data

Jul. 26, 2010 (TW) ............................. 99124581 A

(51) Int. Cl.
*G05F 1/10* (2006.01)
(52) U.S. Cl.
USPC .......................................... 323/271; 323/224

(58) Field of Classification Search
USPC .................. 323/222, 224, 271, 282–284, 286
See application file for complete search history.

(56) References Cited

U.S. PATENT DOCUMENTS

| 7,551,028 B1 * | 6/2009 | Cyrusian | 330/251 |
| 7,714,547 B2 * | 5/2010 | Fogg et al. | 323/224 |
| 7,843,150 B2 * | 11/2010 | Wang et al. | 315/307 |
| 8,085,022 B2 * | 12/2011 | Chen et al. | 323/282 |

\* cited by examiner

*Primary Examiner* — Adolf Berhane
*Assistant Examiner* — Yemane Mehari
(74) *Attorney, Agent, or Firm* — Tung & Associates

(57) ABSTRACT

The present invention discloses a constant on-time switching regulator, a control method therefor, and an on-time calculation circuit for calculating an on-time period of a constant on-time switching regulator. The on-time calculation circuit calculates on-time according to practical conditions. It includes: a driver gate receiving a gate signal of a power switch in a switching regulator, the driver gate operating between high and low levels of a first reference voltage and ground; a low pass filter receiving an output from the driver gate and generating a second reference voltage, a ratio between the second reference voltage and the first reference voltage being substantially the same as a duty ratio of the gate signal; and an on-time generator comparing the second reference voltage with a ramp signal to determine an on-time of the power switch.

23 Claims, 7 Drawing Sheets

$$Ton = \frac{C}{K} \times \frac{Vout}{Vin}$$

US 8,669,747 B2

CONSTANT ON-TIME SWITCHING REGULATOR, AND CONTROL METHOD AND ON-TIME CALCULATION CIRCUIT THEREFOR

CROSS REFERENCE

The present invention is a continuation-in-part application of U.S. Ser. No. 13/066,595, filed on Apr. 19, 2011; the present invention also claims priority to TW 099124581, filed on Jul. 26, 2010.

BACKGROUND OF THE INVENTION

1. Field of Invention

The present invention relates to a constant on-time switching regulator, and a control method and an on-time calculation circuit therefor.

2. Description of Related Art

Referring to FIGS. 1A and 1B, a prior art constant on-time (also referred to as "Ton") switching regulator includes an upper gate power switch UG and a lower gate power switch LG, which are respectively controlled by gate signals Vug and Vlg from driver gates 21 and 22 to convert an input voltage Vin to an output voltage Vout. The constant Ton switching regulator operates as follows: When a feedback voltage Vfb representing the output voltage Vout is lower than a predetermined voltage Vref, a comparator Com generates a comparison signal Vcom with low level, wherein one edge of the comparison signal Vcom determines a starting point of the on-time of the upper gate power switch UG (in a real case, the starting point may be slightly later than the triggering edge of the comparison signal Vcom due to circuit delay, which is omitted in the figure). A control circuit 11 controls the operations of the upper gate power switch UG and the lower gate power switch LG according to the triggering edge of the comparison signal Vcom. A constant Ton circuit 13 generates a signal determining a constant on-time. A one-shot pulse generator 12 turns on, according to a signal from the control circuit 11 and the signal from the constant Ton circuit 13, the upper gate power switch UG for the constant on-time determined by the constant Ton circuit 13. When the on-time is over, the control circuit 11 turns OFF the upper gate power switch UG and turns ON the lower gate power switch LG, until the next time when the feedback voltage Vfb is again lower than the predetermined voltage Vref, and the control circuit 11 turns OFF the lower gate power switch LG and turns ON the upper gate power switch UG ON again. The control circuit 11 operates periodically as thus. In this prior art, because the starting point of the on-time of the upper gate power switch UG depends on the timing when the feedback voltage Vfb is lower than the predetermined voltage Vref, but the on-time is fixed without modulation, the switching regulator does not operate in a fixed-frequency.

In the above circuit, the comparator Com can be replaced by an error amplifier, that is, the comparison signal Vcom can be a digital signal or an analog signal, and the control circuit 11 can be different structures correspondingly.

Referring to FIG. 2A which shows another prior art constant Ton switching regulator, in order to operate the constant Ton switching regulator by fixed-frequency, this prior art proposes to provide a Ton calculation circuit 14 which calculates a proper Ton according to the input voltage Vin and the output voltage Vout, such that the circuit can operate in a fixed-frequency. Referring to FIG. 3, in a continuous conduction mode, when the upper gate voltage Vug is at high level (ON), the lower gate voltage Vlg is at low level (OFF); when the upper gate voltage Vug is at low level (OFF), the lower gate voltage Vlg is at high level (ON). A phase voltage Vph at a node between the upper gate power switch UG and the lower gate power switch LG follows the waveform of the upper gate voltage Vug. In an ideal case, when the upper gate power switch UG is ON, the phase voltage Vph is equal to the input voltage Vin; when the lower gate power switch LG is ON, the phase voltage Vph is equal to 0. In other words, in the ideal case, the ratio of the input voltage to the output voltage is equal to the duty ratio D of the upper gate voltage Vug, that is, the ratio of Ton to period T. Thus, if the period T of the constant Ton switching regulator can be controlled by the following way:

$$T = Ton \times \frac{Vin}{Vout},$$

then the circuit can operate in a fixed-frequency.

According to the above, the prior art proposes the Ton calculation circuit 14 shown in FIG. 2B, wherein a current source Cs1 generating a current K-times of the input voltage Vin (i.e., the current source Cs1 generates a current of K*Vin) charges a capacitor C1 having a capacitance of C to generate a voltage Vc across the capacitor. A comparator Com1 compares the voltage Vc and the output voltage Vout to generate a square wave signal. According to the equation t=CV/I (time=capacitance*voltage/current), the Ton calculation circuit 14 generates the desired Ton for the upper gate power switch UG when the comparator Com1 outputs a high level signal, as the following:

$$Ton = \frac{C}{K} \times \frac{Vout}{Vin}.$$

In other words, in the ideal case, Ton=(C/K)×D, and Ton can be set to a proper value by adjusting K and C such that the constant Ton switching regulator operates in a fixed-frequency.

However, in a real case as shown in FIG. 4, the high level and low level of the phase voltage Vph are not Vin and 0. Due to the turn-ON resistances of the upper gate power switch UG and the lower gate power switch LG, the high level and low level of the phase voltage Vph are actually Vin-IL*Rug and −IL*Rlg, where IL is the load current and Rug and Rlg are the turn-ON resistances of the upper gate and lower gate power switches, respectively. Thus, under the prior art structure in FIGS. 2A-2B, the output voltage Vout is not equal to Vin*D actually, that is, $$Ton = \frac{C}{K} \times \frac{Vout}{Vin} \neq \frac{C}{K} \times D.$$

Therefore, the Ton calculation circuit 14 designed under the ideal case assumption cannot achieve fixed-frequency operation.

SUMMARY OF THE INVENTION

An objective of the present invention is to provide a constant on-time switching regulator.

Another objective of the present invention is to provide a method for controlling the constant on-time switching regulator.

A further other objective of the present invention is to provide an on-time calculation circuit for the constant on-time switching regulator.

To achieve the foregoing objectives, in one perspective of the present invention, it provides a constant on-time switching regulator comprising: a power stage circuit including at least one power switch operating according to a duty ratio D to convert an input voltage to an output voltage; a comparator comparing a feedback voltage which represents the output voltage with a predetermined voltage to generate a comparison signal; a control circuit controlling an operation of the power switch, the control circuit determining a starting point of an on-time of the power switch according to the comparison signal; and an on-time calculation circuit receiving a duty signal related to the duty ratio D of the power switch, and calculating the on-time according to a duty ratio of the duty signal.

In one embodiment, the on-time calculation circuit may include: (a) a driver gate receiving the duty signal related to the duty ratio D of the power switch and generating a driver gate output signal, the driver gate operating between high and low levels of a first reference voltage and ground; (b) a low pass filter receiving the driver gate output signal from the driver gate and generating a second reference voltage, a ratio between the second reference voltage and the first reference voltage being substantially the same as a duty ratio D of the power switch; and (c) an on-time generator comparing the second reference voltage from the low pass filter with a ramp signal to determine the on-time of the power switch.

In another embodiment, the on-time calculation circuit may include: a sampling circuit receiving a duty signal related to the duty ratio D of the power switch, and receiving a sampling signal by which a ratio of a high level period to a low level period of the duty signal is calculated to generate a sampled result, wherein the frequency of the sampling signal is higher than that of the duty signal; and a digital-to-analog converter receiving the sampled result to generate the on-time of the power switch.

In yet another perspective of the present invention, it provides a method for controlling a constant on-time switching regulator having a power stage circuit including at least one power switch operating according to a duty ratio D to convert an input voltage to an output voltage, the method comprising: receiving a feedback voltage which represents the output voltage, and comparing the feedback voltage with a predetermined voltage to generate a comparison signal; determining a starting point of an on-time of the power switch according to the comparison signal; receiving a duty signal related to the duty ratio D of the power switch; and calculating the on-time according to a duty ratio of the duty signal.

In the foregoing method, according to one embodiment, the on-time is calculated by steps including: generating a first signal having high and low levels of a first reference voltage and ground respectively according to the duty ratio of the duty signal, wherein a duty ratio of the first signal is substantially the same as the duty ratio of the duty signal; obtaining an average value of the first signal as a second signal; and comparing the second signal with a ramp signal to determine an on-time of the power switch.

In the foregoing method, according to another embodiment, the on-time is calculated by steps including: receiving the duty signal and a sampling signal, wherein the frequency of the sampling signal is higher than that of the duty signal; calculating a ratio of a high level period to a low level period of the duty signal by the sampling signal to generate a sampled result; and generating the on-time of the power switch according to the sampled result.

In the foregoing on-time calculation circuit, the constant on-time switching regulator, or the control method, in one embodiment, the on-time can be calculated by: charging a capacitor having a capacitance of C by a current source having a current I, and comparing the second reference voltage or second signal with a voltage across the capacitor by a comparator. When the current source generates a current I equivalent to K times of the first reference voltage, the on-time is:

$$\text{on-time} = \frac{C}{K} \times \text{duty ratio } D.$$

When the current I is not correlated to the first voltage, the on-time is:

$$\text{on-time} = \frac{C \times 2\text{nd reference voltage}}{I} \times \text{duty ratio } D.$$

The objectives, technical details, features, and effects of the present invention will be better understood with regard to the detailed description of the embodiments below, with reference to the drawings.

DESCRIPTION OF THE PREFERRED EMBODIMENTS

Figure 1A:
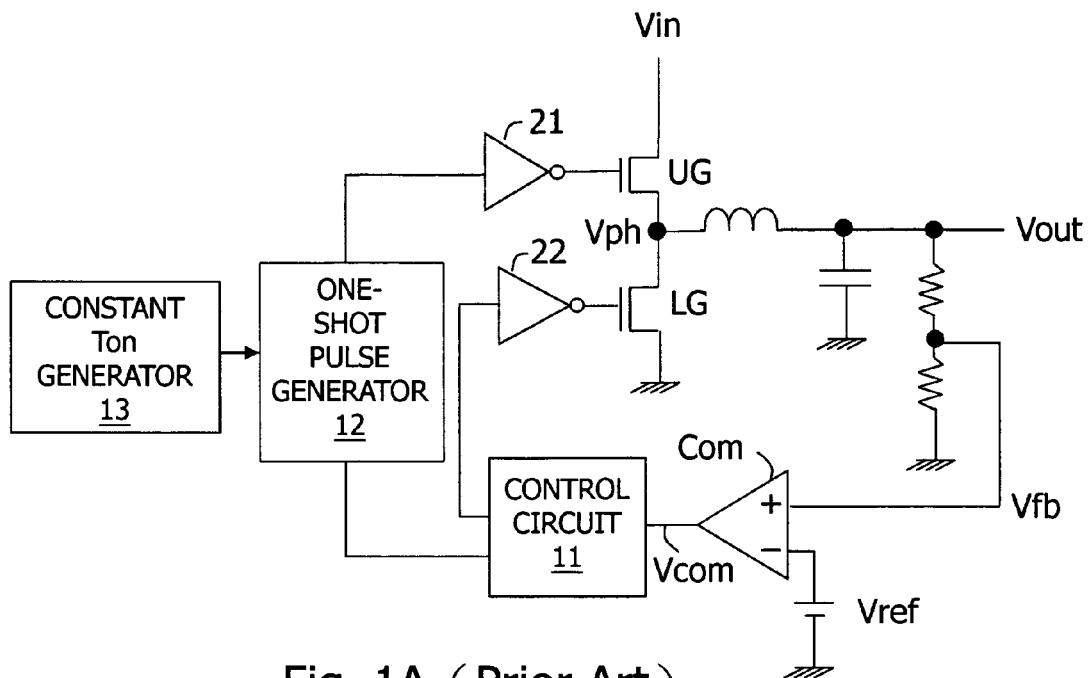
FIG. 1A shows a prior art constant Ton switching regulator whose drawback is that the regulator cannot operate in a fixed-frequency.
Figure 1B:
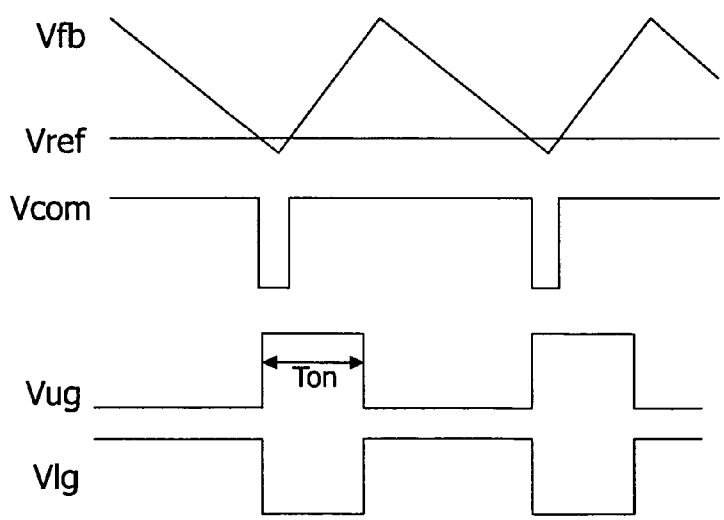
FIG. 1B shows operation waveforms of the constant Ton switching regulator.
Figure 2A:
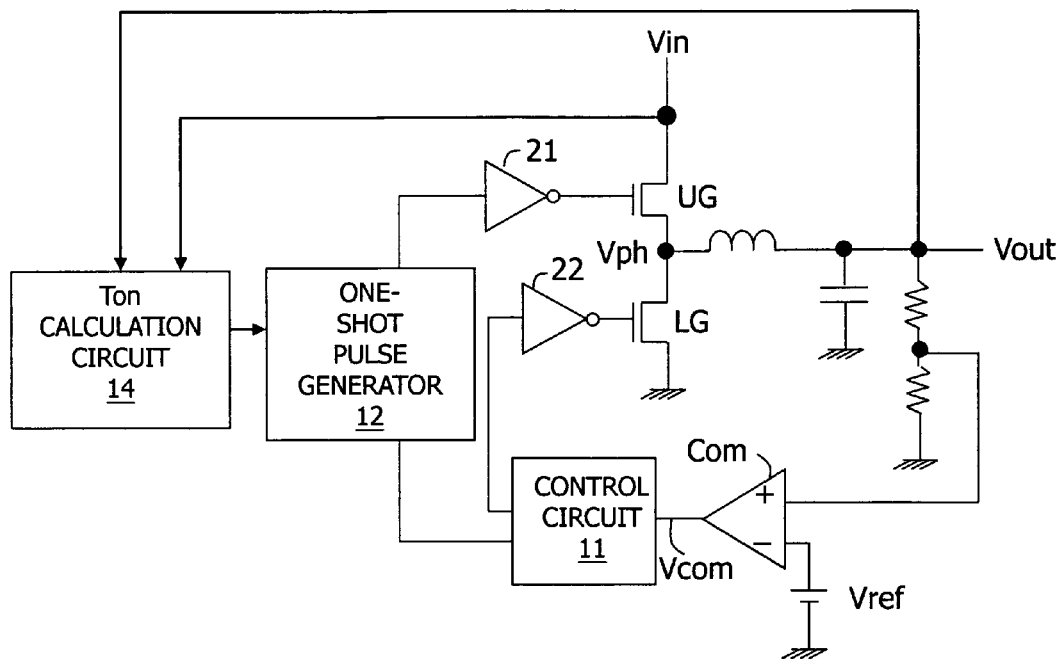
FIGS. 2A-2B show another prior art constant Ton switching regulator whose drawback is that the on-time calculated by the Ton calculation circuit is incorrect so that the regulator cannot operate in a fixed-frequency correctly.
Figure 2B:
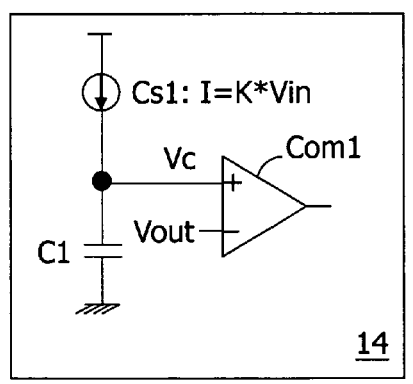
Figure 3:
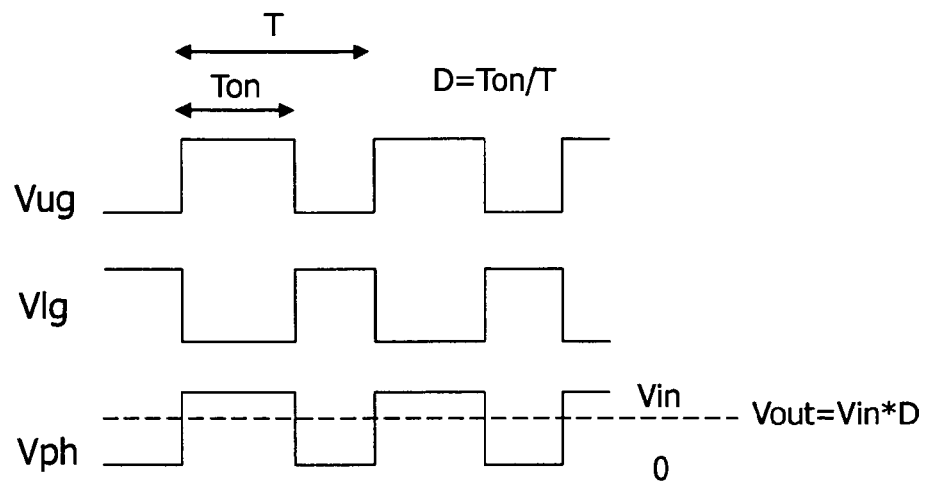
FIG. 3 shows an ideal relationship among a phase voltage Vph, an upper gate voltage Vug, and a lower gate voltage Vlg in the constant Ton switching regulator of FIGS. 2A-2B.
Figure 4:
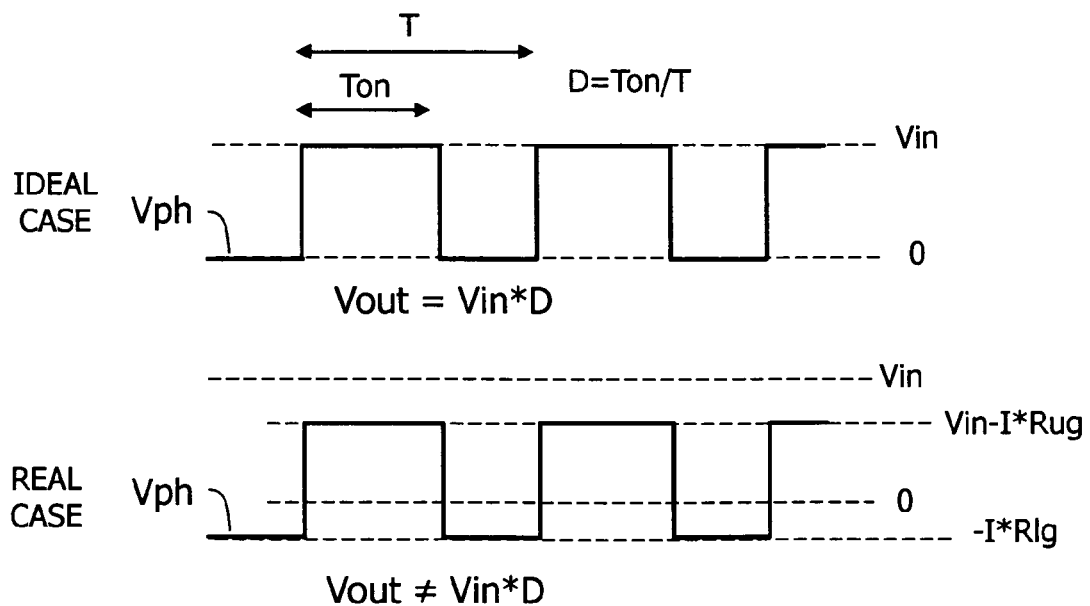
FIG. 4 shows a comparison between the phase voltage Vph in an ideal case and the phase voltage Vph in a real case.

Referring to FIG. 4, the inaccuracy in the prior art results from the assumption that Vin=Vout*D. However, due to non-ideal effects (such as the turn-ON resistances of the upper and lower gate power switches UG and LG), the duty ratio D in a real case is quite different from that in an ideal case, so that the calculated on-time is incorrect and the constant Ton switching regulator cannot operate in a fixed-frequency. To overcome the drawbacks in the prior art, the present invention proposes solutions as described in the following.

Figure 5:
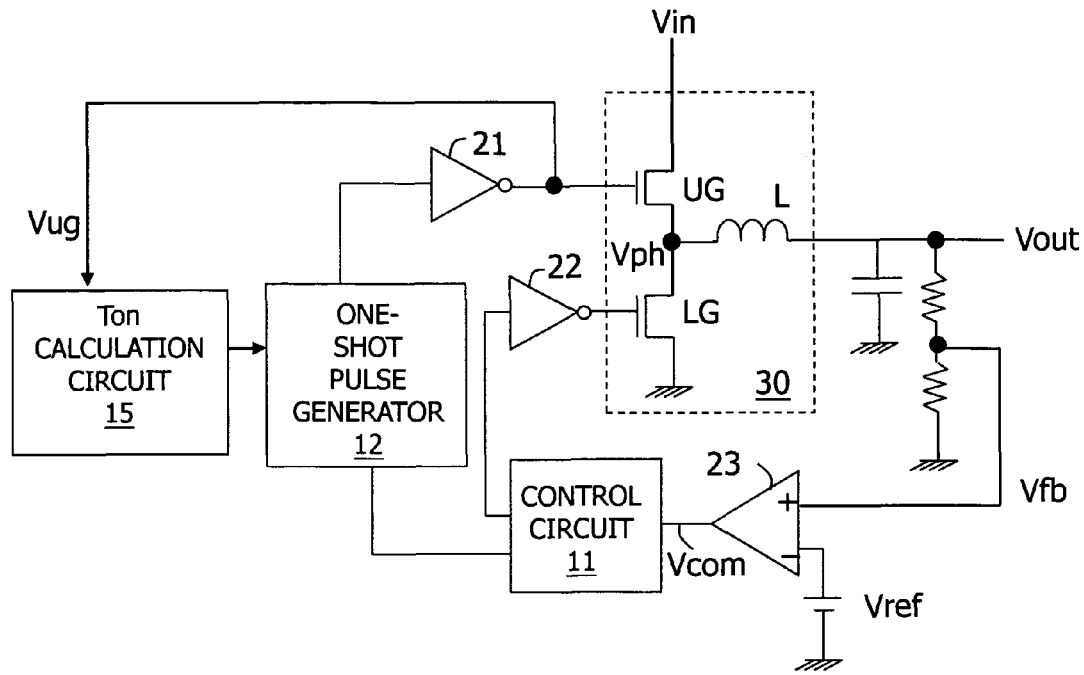
FIG. 5 shows a basic structure of a constant Ton switching regulator in the present invention.

FIG. 5 shows a circuit structure of a first embodiment according to the present invention. In this embodiment, the upper and lower gate power switches UG and LG and an inductor construct a power stage circuit 30 which is shown in the FIG. as a buck converter for example, but it can be other types of power converters. A comparison circuit 23 generates, according to a comparison result of a feedback voltage Vfb which represents the output voltage Vout and a predetermined reference voltage Vref, a comparison signal Vcom which is sent to a control circuit 11 to determine a starting point of the Ton of the upper gate power switch UG, wherein the comparison circuit 23 may be a comparator or an error amplifier and the comparison signal Vcom may be a digital signal or an analog signal. The control circuit 11 controls the operations of the upper gate power switch UG and the lower gate power switch LG, wherein the on-time of the upper gate power switch UG is determined by a Ton calculation circuit 15, and a one-shot pulse generator 12 generates, according to output signals from the control circuit 11 and the Ton calculation circuit 15, a one-shot pulse which controls the starting point and the on-time of the upper gate power switch UG. In order to provide a proper gate driving voltage, the one-shot pulse generator 12 drives the upper gate power switch UG through a driver gate 21 and the control circuit 11 drives the lower gate power switch LG through a driver gate 22.

Figure 6:
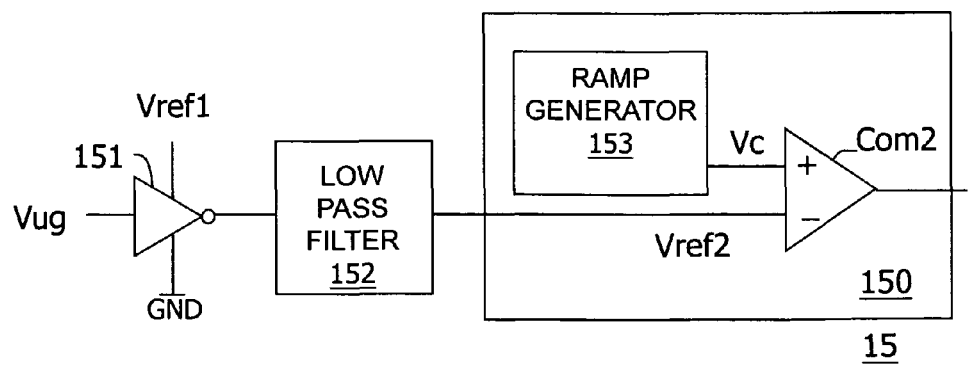
FIG. 6 illustrates a schematic diagram of a Ton calculation circuit 15 in the present invention.

One feature of the present invention is to provide the Ton calculation circuit 15 which calculates the Ton of the upper gate power switch UG according to practical conditions. That is, the Ton calculation circuit 15 calculates the Ton of the upper gate power switch UG according to the actual duty ratio D of the upper gate power switch UG; this actual duty ratio D can be obtained from any signal related to the duty ratio D of the upper gate power switch UG, such as the upper gate voltage Vug, an input signal to the driver gate 21, or an internal signal of the control circuit 11, etc. In the following description, the upper gate voltage Vug will be used as an example to explain the present invention, but it should be noted that the same principle can be applied to any other signal related to the duty ratio D of the power switch UG. In other words, the Ton calculation circuit 15 is not limited to directly receiving the upper gate voltage Vug as shown in FIG. 5, but the Ton calculation circuit 15 also can receive any other signal related to the duty ratio D of the power switch UG, and calculates the Ton from it. The upper gate voltage Vug described below is only an example. Referring to FIG. 6, the Ton calculation circuit in the present invention includes a Ton generator 150, a driver gate 151 and a low pass filter 152, wherein the Ton generator 150 comprises a ramp generator 153 and a comparator Com2. The driver gate 151 operates according to high and low operation levels which are, respectively, reference voltage Vref1 and ground GND. The driver gate 151 receives the upper gate voltage Vug and generates an output; the output of the driver gate 151 passes through the low pass filter 152 to generate a reference Vref2 which is sent to one input terminal of the comparator Com2 in the Ton generator 150. Further, the ramp generator 153 generates a voltage signal Vc which is sent to the other input terminal of the comparator Com2. Thus, the Ton calculation circuit 15 can generate the correct Ton at the output of the comparator Com2.

Figure 7A:
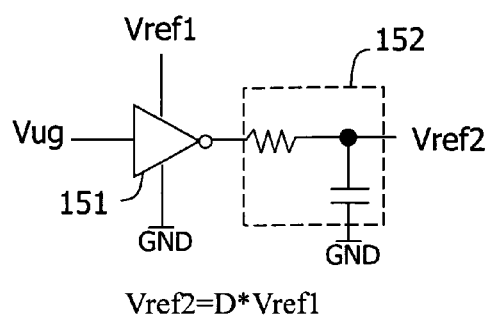
FIGS. 7A-7B show an embodiment of the Ton calculation circuit 15 according to the present invention.
Figure 7B:
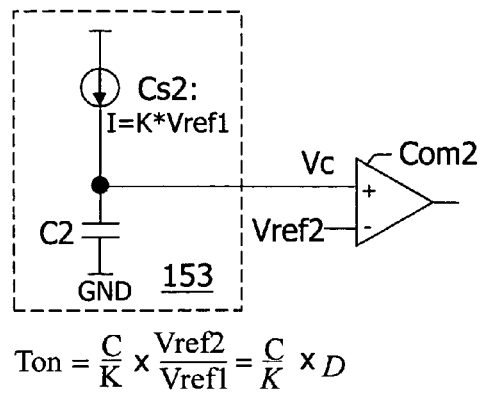
Figure 8:
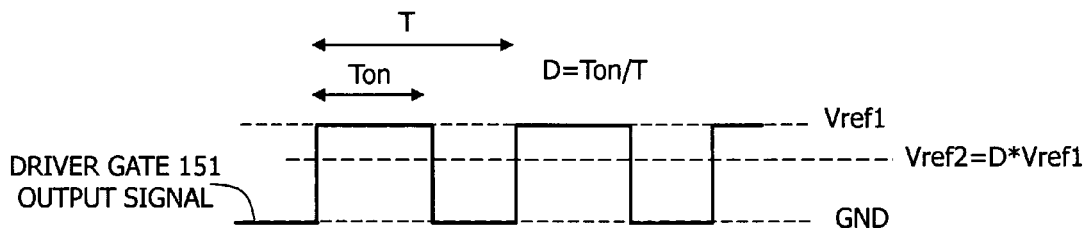
FIG. 8 shows that the present invention can calculate a correct duty ratio D.

The following description explains how the Ton calculation circuit 15 generates the Ton which is more correct than the Ton in the prior art. FIGS. 7A-7B show an embodiment of the Ton calculation circuit 15. In this embodiment, a RC (resistor-capacitor) circuit forms the low pass filter 152 (FIG. 7A). Referring to FIG. 8, because the driver gate 151 operates according to high and low operation levels of the reference voltage Vref1 and ground GND, as the driver gate 151 receives the upper gate voltage Vug, it outputs a square wave signal having a duty ratio D the same as the duty ratio of the upper gate voltage Vug, while the square wave signal has the high and low levels of the reference voltage Vref1 and ground GND. The output of the driver gate 151 passes through the low pass filter 152 to generate a reference voltage Vref2 which is equal to an average of the reference voltage Vref1, that is, the ratio of the reference voltage Vref2 to the reference voltage Vref1 can precisely reflect the duty ratio D of the constant Ton switching regulator, as expressed below:

$$\text{duty ratio } D = \frac{\text{reference voltage } Vref2}{\text{reference voltage } Vref1}.$$

Referring to FIG. 7B, the ramp generator 153 includes a current source Cs2 whose current I is K-times of the reference voltage Vref, that is, I=K*Vref1, and the current source Cs2 charges a capacitor C2 having a capacitance of C to generate a voltage Vc across the capacitor C2. The comparator Com2 compares the voltage Vc and the reference voltage Vref2. According to t=CV/I (time=capacitance*voltage/current), the on-time of the upper gate voltage Vug can be generated as below:

$$Ton = \frac{C}{K} \times \frac{\text{reference voltage } Vref2}{\text{reference voltage } Vref1} = \frac{C}{K} \times D.$$

In other words, the comparator Com2 (and thus the Ton calculation 15) generates an output which has a correct duty ratio D such that the whole circuit can actually operate in a fixed-frequency.

Figure 9A:
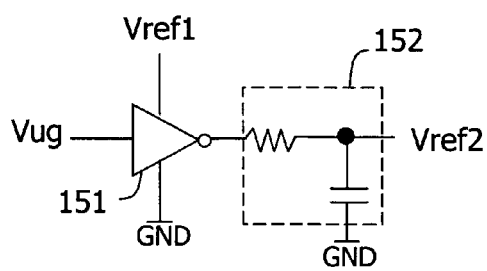
FIGS. 9A-9B show another embodiment of the Ton calculation circuit 15 according to the present invention.
Figure 9B:
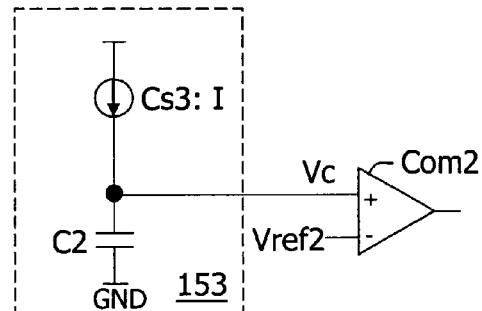

FIGS. 9A-9B show a second embodiment of the Ton calculation circuit 15. Referring to FIG. 9B, in this embodiment, the ramp signal generator includes a current source Cs3 having a current I, and it charges a capacitor C2 having a capacitance of C. In this embodiment the current source Cs3 is an independent current source, that is, its current I does not need to correlate to the reference voltage Vref1. The on-time of the upper gate switch UG can be calculated by the following equation:

$$Ton = \frac{C \times \text{reference voltage } Vref2}{I} =$$
$$\frac{C \times \text{reference voltage } Vref1}{I} \times D = K' \times D$$

That is, because the capacitance C, the reference voltage Vref1 and the current I are constants, it can be regarded as K'=C×Vref1/I; in this way, the comparator Com2 (and thus the Ton calculation circuit 15) outputs a signal which has a correct correlation with the duty ratio D such that the whole circuit can actually operate in a fixed-frequency.

In the embodiments shown in FIGS. 7A-7B, 8 and 9A-9B, it should be explained that it is not necessary for the ground GND to be 0V; instead, it can be a relative ground provided in the circuit. As can be understood from FIGS. 7A-7B and 9A-9B, as long as the low operation level of the driver gate 151, the low side of the low pass filter 152 and the low side of the capacitor C2 are at the same level, the comparator Com2 can generate the required output; therefore, it is not necessary for the relative ground GND to be absolute 0V.

Figure 10:
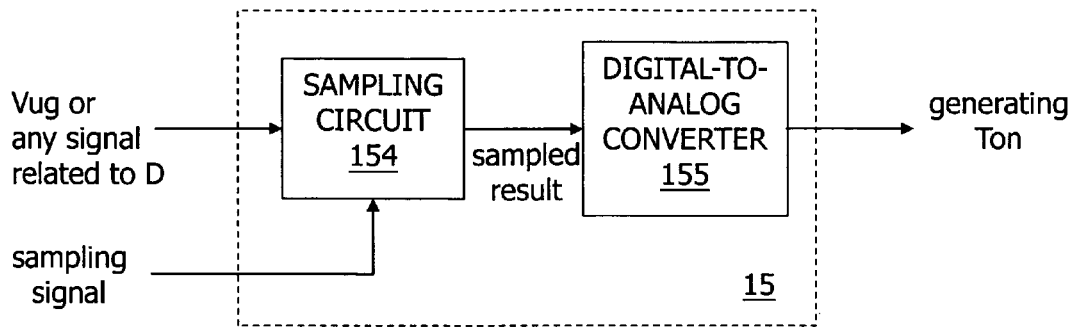
FIG. 10 shows a further other embodiment of the Ton calculation circuit 15 according to the present invention.
Figure 11:
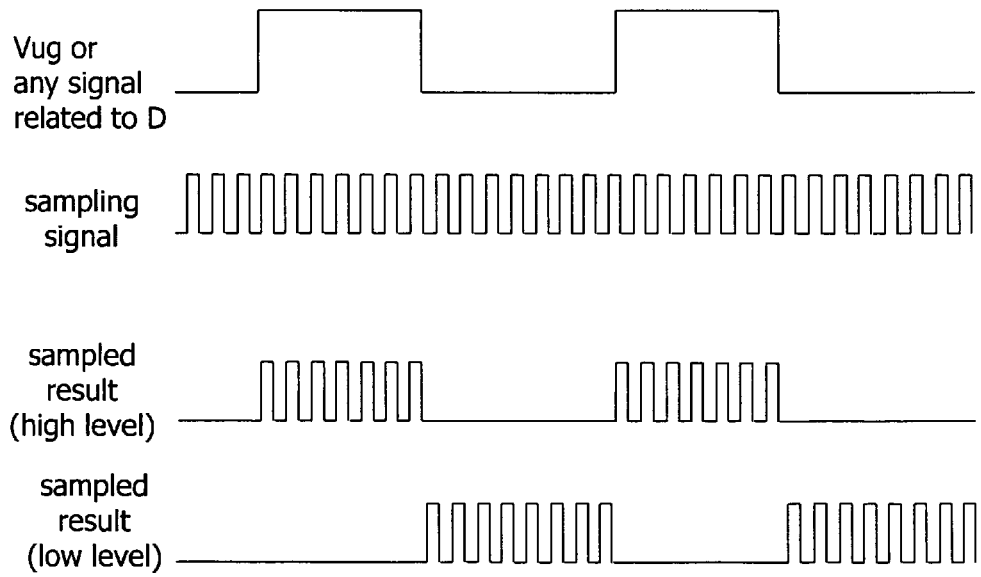
FIG. 11 explains that the duty ratio D can be obtained by a sampling signal having a higher frequency.
Figure 12A:
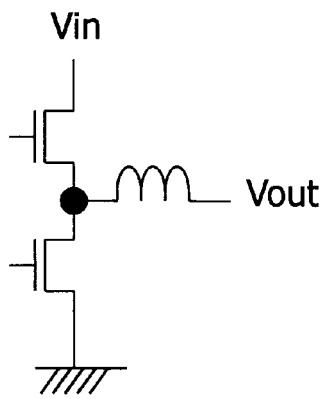
FIGS. 12A-12F show that the power stage circuit 30 can be a synchronous or asynchronous buck, boost or inverting converter.
Figure 12B:
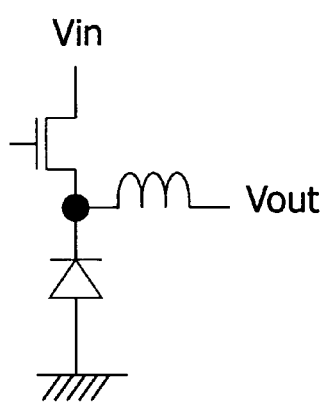
Figure 12C:
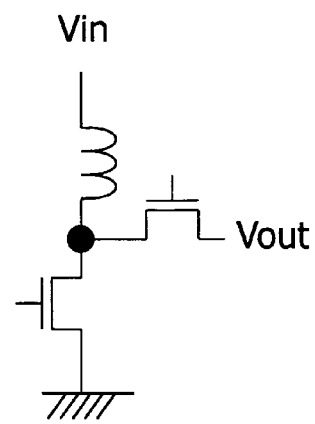
Figure 12D:
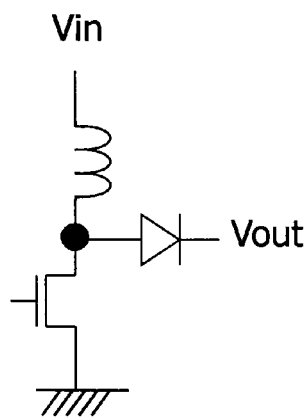
Figure 12E:
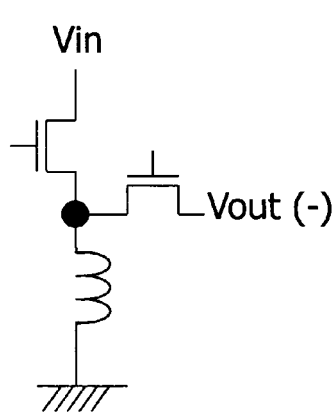
Figure 12F:
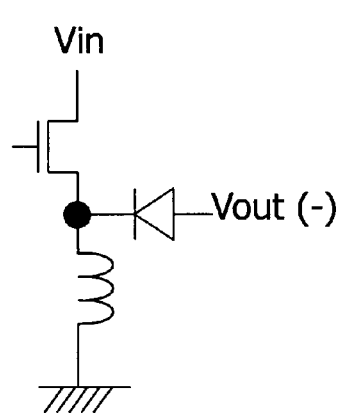

Please refer to FIG. 10 for another embodiment of the Ton calculation circuit 15 according to the present invention. In this embodiment, the Ton calculation circuit 15 calculates the Ton by digital means; the Ton calculation circuit 15 includes a sampling circuit 154 and a digital-to-analog converter 155. The sampling circuit 154 receives a signal related to the duty ratio D of the power switch (for example but not limited to the upper gate voltage Vug), and it also receives a sampling signal, wherein the sampling signal can be, for example, an internal high frequency signal having a frequency higher than that of the duty signal. The sampling circuit 154 samples the signal related to the duty ratio D of the power switch by the sampling signal to generate a sampled result which is sent to the digital-to-analog converter 155 to generate the Ton of the power switch. An example for generating the sampled, result is shown in FIG. 11, in which the sample circuit 154 calculates a ratio of a high level period to a low level period of the upper gate voltage Vug by means of the higher frequency sampling signal. More specifically, if the high level period of the upper gate voltage Vug is x times of the period of the sampling signal while the low level period of the upper gate voltage Vug is y times of the period of the sampling signal, the duty ratio D can be calculated according to a relationship between x and y, that is, D=x/(x+y). A digital signal generated according to the correct duty ratio D can be converted to an analog signal by the digital-to-analog converter 155. The analog signal is used to generate the Ton by, for example but not limited to, comparing the analog signal with a ramp signal. Because the Ton is generated according to the correct duty ratio D, the whole circuit can truly operate in a fixed-frequency. It should be noted that the square wave signals shown in FIG. 11 is for illustration only and should not be taken as a limitation to the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the power stage circuit 30 can be other power stage converters instead of the synchronous buck converter shown in FIG. 5, such as the synchronous or asynchronous buck, boost or inverting converter shown in FIGS. 12A-12F. As another example, a device which does not affect the primary functions of the circuits can be interposed between two devices or circuits shown to be in direct connection in the illustrated embodiments. As yet another example, the upper and lower gate power switches UG and LG in the power stage circuit 30 can be NMOSFETs or PMOSFETs or a combination of NMOSFET and PMOSFET; the meaning expressed by high level of a signal can instead be expressed by low level, with corresponding modifications in the circuit. Further, the control circuit 11 and the one-shot pulse generator 12 can be integrated into one circuit, or can be arranged in a different order. Thus, the present invention should cover all such and other modifications and variations, which should be interpreted to fall within the scope of the following claims and their equivalents.

What is claimed is:

1. An on-time calculation circuit for a constant on-time switching regulator having a power stage circuit including at least one power switch operating according to a duty ratio D to convert an input voltage to an output voltage, wherein the on-time calculation circuit calculates a constant on-time of the power switch, the on-time calculation circuit comprising:
a driver gate receiving a duty signal related to the duty ratio D of the power switch and generating a driver gate output signal, the driver gate operating between high and low levels of a first reference voltage and ground;
a low pass filter receiving the driver gate output signal from the driver gate and generating a second reference voltage, a ratio between the second reference voltage and the first reference voltage being substantially the same as the duty ratio D of the power switch; and
an on-time generator comparing the second reference voltage from the low pass filter with a ramp signal to determine an on-time of the power switch.

2. The on-time calculation circuit of claim 1, wherein the on-time generator comprises:
a current source generating a current equivalent to K times of the first reference voltage;
a capacitor having a capacitance of C; and
a comparator,
wherein the current source charges the capacitor and the comparator compares the second reference voltage with a voltage across the capacitor to generate an output signal with the on-time:

$$\text{on-time} = \frac{C}{K} \times \text{duty ratio } D.$$

3. The on-time calculation circuit of claim 1, wherein the on-time generator comprises:
a current source generating a current I;
a capacitor having a capacitance of C; and
a comparator,
wherein the current source charges the capacitor and the comparator compares the second reference voltage with a voltage across the capacitor to generate an output signal with the on-time:

$$\text{on-time} = \frac{C \times 2\text{nd reference voltage}}{I} \times \text{duty ratio} D.$$

4. The on-time calculation circuit of claim 1, wherein the duty signal is a gate voltage of the power switch.

5. The on-time calculation circuit of claim 1, wherein the power stage circuit comprises: a buck converter, a boost converter, or an inverting converter.

6. An on-time calculation circuit for a constant on-time switching regulator having a power stage circuit including at least one power switch operating according to a duty ratio D to convert an input voltage to an output voltage, wherein the on-time calculation circuit calculates a constant on-time of the power switch, the on-time calculation circuit comprising:
a sampling circuit receiving a duty signal related to the duty ratio D of the power switch, and receiving a sampling signal by which a ratio of a high level period to a low level period of the duty signal is calculated to generate a sampled result, wherein the frequency of the sampling signal is higher than that of the duty signal; and
a digital-to-analog converter receiving the sampled result to generate the on-time of the power switch, wherein the on-time is a constant on-time whereby the power stage circuit operates under a fixed frequency according to the constant on-time.

7. The on-time calculation circuit of claim 6, wherein the duty signal is a gate voltage of the power switch.

8. The on-time calculation circuit of claim 6, wherein the power stage circuit comprises: a buck converter, a boost converter, or an inverting converter.

9. A constant on-time switching regulator comprising:
a power stage circuit including at least one power switch operating according to a duty ratio D to convert an input voltage to an output voltage;
a comparator comparing a feedback voltage which represents the output voltage with a predetermined voltage to generate a comparison signal;
a control circuit controlling an operation of the power switch, the control circuit determining a starting point of an on-time of the power switch according to the comparison signal; and
an on-time calculation circuit receiving a duty signal related to the duty ratio D of the power switch, and calculating the on-time according to a duty ratio of the duty signal, wherein the calculated on-time is a constant on-time whereby the power stage circuit operates under a fixed frequency according to the constant on-time.

10. The constant on-time switching regulator of claim 9, wherein the on-time calculation circuit includes:
(a) a driver gate receiving the duty signal related to the duty ratio D and generating a driver gate output signal, the driver gate operating between high and low levels of a first reference voltage and ground;
(b) a low pass filter receiving the driver gate output signal from the driver gate and generating a second reference voltage, a ratio between the second reference voltage and the first reference voltage being substantially the same as the duty ratio D of the power switch; and
(c) an on-time generator comparing the second reference voltage from the low pass filter with a ramp signal to determine the on-time of the power switch.

11. The constant on-time switching regulator of claim 9, wherein the on-time generator comprises:
a current source generating a current equivalent to K times of the first reference voltage;
a capacitor having a capacitance of C; and
a comparator,
wherein the current source charges the capacitor and the comparator compares the second reference voltage with a voltage across the capacitor to generate an output signal with the on-time:

$$\text{on-time} = \frac{C}{K} \times \text{duty ratio } D.$$

12. The constant on-time switching regulator of claim 9, wherein the on-time generator comprises:
a current source generating a current I;
a capacitor having a capacitance of C; and
a comparator,
wherein the current source charges the capacitor and the comparator compares the second reference voltage with a voltage across the capacitor to generate an output signal with the on-time:

$$\text{on-time} = \frac{C \times \text{2nd reference voltage}}{I} \times \text{duty ratio} D.$$

13. The constant on-time switching regulator of claim 9, wherein the on-time calculation circuit comprises:
a sampling circuit receiving a duty signal related to the duty ratio D of the power switch, and receiving a sampling signal by which a ratio of a high level period to a low level period of the duty signal is calculated to generate a sampled result, wherein the frequency of the sampling signal is higher than that of the duty signal; and
a digital-to-analog converter receiving the sampled result to generate the on-time of the power switch.

14. The on-time calculation circuit of claim 9, wherein the duty signal is a gate voltage of the power switch.

15. The constant on-time switching regulator of claim 9, wherein the power stage circuit comprises: a buck converter, a boost converter, or an inverting converter.

16. The constant on-time switching regulator of claim 9, further comprising: a one-shot pulse generator receiving outputs from the control circuit and the on-time calculation circuit, and generating a pulse controlling an operation of the power switch according to the starting point and the on-time.

17. The constant on-time switching regulator of claim 16, further comprising: a driver gate coupled between the one-shot pulse generator and a gate of the power switch.

18. A method for controlling a constant on-time switching regulator having a power stage circuit including at least one power switch operating according to a duty ratio D to convert an input voltage to an output voltage, the method comprising:
receiving a feedback voltage which represents the output voltage, and comparing the feedback voltage with a predetermined voltage to generate a comparison signal;
determining a starting point of an on-time of the power switch according to the comparison signal;
receiving a duty signal related to the duty ratio D of the power switch; and
calculating the on-time according to a duty ratio of the duty signal, wherein the calculated on-time is a constant on-time whereby the power stage circuit operates under a fixed frequency according to the constant on-time.

19. The method of claim 18, wherein the step of calculating the on-time includes:
generating a first signal with high and low levels of a first reference voltage and ground according to the duty ratio of the duty signal, wherein the duty ratio of the first signal is substantially the same as a duty ratio D of the power switch;
obtaining an average value of the first signal as a second signal; and
comparing the second signal with a ramp signal to determine an on-time of the power switch.

20. The method of claim 19, wherein the ramp signal is generated by steps including: generating a current I by a current source, and charging a capacitor with a capacitance of C by the current I.

21. The method of claim 20, wherein the current I is equal to K times of the first signal.

22. The method of claim 18, wherein the step of calculating the on-time includes:
receiving a duty signal related to the duty ratio D of the power switch, wherein the frequency of the sampling signal is higher than that of the duty signal;
calculating a ratio of a high level period to a low level period of the duty signal by the sampling signal to generate a sampled result; and
generating the on-time of the power switch according to the sampled result.

23. The method of claim 18, wherein the duty signal is a gate voltage of the power switch.

* * * * *